United States Patent [19]
Callanan

[11] Patent Number: 5,747,981
[45] Date of Patent: May 5, 1998

[54] INDUCTOR FOR AN ELECTRICAL SYSTEM

[75] Inventor: Robert J. Callanan, Northville, Mich.

[73] Assignee: Ford Motor Company, Dearborn, Mich.

[21] Appl. No.: 758,717

[22] Filed: Dec. 2, 1996

[51] Int. Cl.[6] .................... H01F 27/24; H01F 27/26
[52] U.S. Cl. .................... 323/362; 336/210; 336/211
[58] Field of Search .................... 323/362, 282;
363/47, 48, 135, 26, 70; 336/210, 127,
217, 175, 211; 333/177, 167, 12, 25; 340/25,
310

[56] References Cited

U.S. PATENT DOCUMENTS

| | | |
|---|---|---|
| 4,264,827 | 4/1981 | Herzog .................... 336/73 |
| 4,853,668 | 8/1989 | Bloom .................... 323/362 |
| 5,038,264 | 8/1991 | Steigerwald . | |
| 5,095,291 | 3/1992 | Staschover et al. . | |
| 5,119,059 | 6/1992 | Covi et al. . | |
| 5,210,519 | 5/1993 | Moor .................... 340/310 R |
| 5,535,189 | 7/1996 | Tomlinson . | |

Primary Examiner—Peter S. Wong
Assistant Examiner—Rajnikant B. Patel
Attorney, Agent, or Firm—Mark S. Sparschu

[57] ABSTRACT

In one embodiment of the present invention, an inductor comprises a core defining a first electromagnetic path, a second electromagnetic path and a third electromagnetic path, the third electromagnetic path substantially closing the first and second electromagnetic paths. The inductor also includes a first electrical coil wound about at least a portion of the first electromagnetic path and a second electrical coil wound about at least a portion of the second electromagnetic path. Another embodiment of the present invention uses the inductor in an electrical system such as a DC-to-DC converter. Inductors constructed according to the present invention can be used to provide "common mode" inductance and "differential mode" inductance in a single inductor.

18 Claims, 2 Drawing Sheets

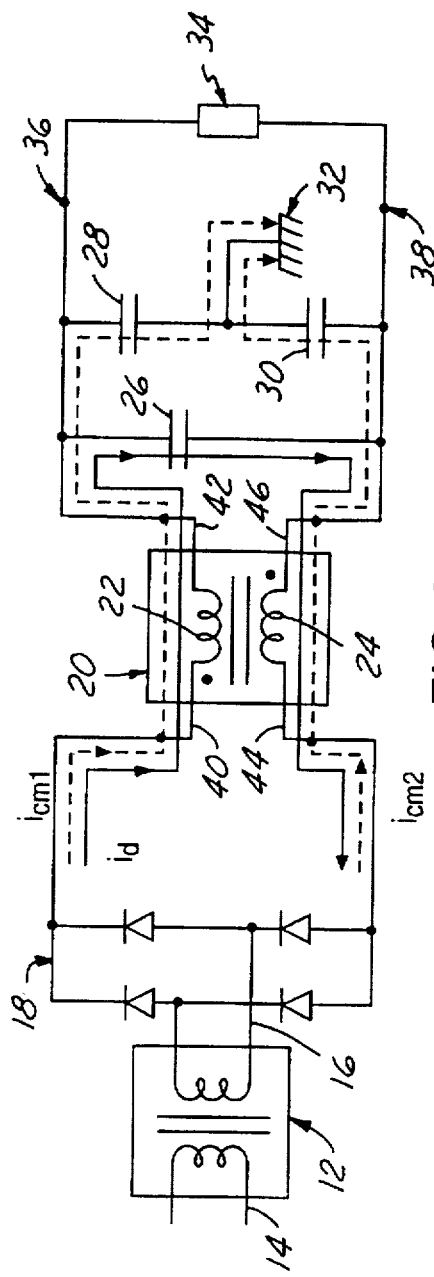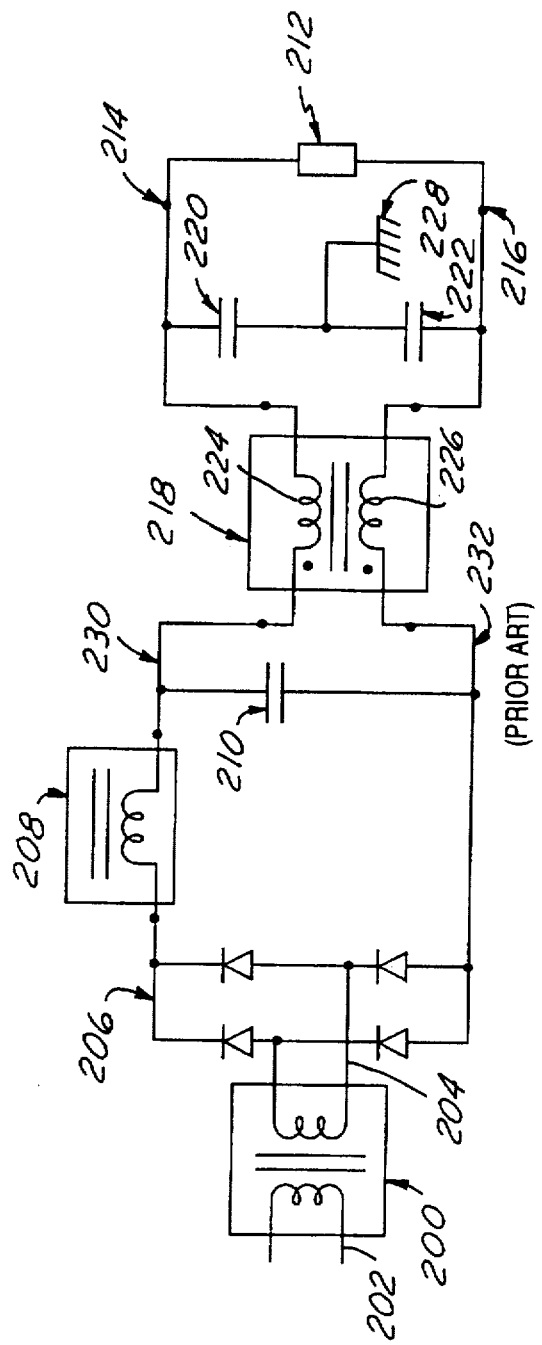
FIG.1
FIG.5 (PRIOR ART)

INDUCTOR FOR AN ELECTRICAL SYSTEM

BACKGROUND OF THE INVENTION

1. Field of the Invention

The present invention relates to electrical systems which contain inductors.

2. Description of the Related Art

In electrical systems, inductors are often used for electrical filtering. One such system is a DC-to-DC converter as illustrated in FIG. 5. Here, a transformer 200 is supplied with a switching voltage at its primary coil 202, resulting in a switching voltage at its secondary coil 204. A rectifier 206 is coupled to secondary coil 204. Coupled to rectifier 206 is a buck inductor 208 and a capacitor 210. The output of the DC-to-DC converter is provided to one or more electrical loads 212 connected across output terminals 214 and 216.

The switching voltages generated by transformer 200 can cause "common mode" voltages with respect to ground which would appear at both terminals 214 and 216 (hence, the term "common mode"). Because of capacitance to ground of some of electrical loads 212, the common mode voltages can generate disruptive common mode currents.

To avoid the problem with common mode voltages and currents, choke 218 and "Y" capacitors 220 and 222 are typically provided. Choke 218 is an inductor containing two coils 224 and 226. Coil 224 and capacitor 220 filter to ground 228 common mode voltages appearing at upper rail 230. Coil 226 and capacitor 222 filter to ground common mode voltages appearing at lower rail 232.

The use of buck inductor 208 and common mode choke 218 are generally effective in performing their respective filtering functions. However, where a large current is supplied to loads 212 by the DC to DC converter, buck inductor 208 and common mode choke 218 are each typically large components. In fact, they are each typically wound on their own cores, each core made of ferromagnetic material such as iron. Where packaging is tight, such as in an electric vehicle, alternative designs which can reduce the volume occupied by the buck inductor and common mode choke can be very advantageous.

SUMMARY OF THE INVENTION

The present invention provides an inductor which comprises a core defining a first electromagnetic path, a second electromagnetic path and a third electromagnetic path, the third electromagnetic path substantially closing the first and said second electromagnetic paths. The inductor also includes a first electrical coil wound about at least a portion of the first electromagnetic path and a second electrical coil wound about at least a portion of the second electromagnetic path. In another embodiment of the present invention, the inductor is included in an electrical apparatus.

The present invention further provide a second 25 inductor. The inductor comprises a first E-core member first, second and third parallel legs. The inductor additionally includes a second E-core member comprising fourth, fifth and sixth parallel legs pointing toward the first, second and third parallel legs, respectively. Also, the inductor comprises an I-core member disposed between the first and second E-core members.

In addition, the present invention provides another inductor. This inductor comprises a first E-core member comprising first, second and third parallel legs. The inductor also includes a second E-core member comprising fourth, fifth and sixth parallel legs pointing toward the first, second and third parallel legs, respectively. Further, the inductor contains a first I-core member disposed between the first and fourth legs and pointing perpendicular to the first and fourth legs. Additionally, the inductor comprises a second I-core member disposed between the third and the sixth legs and pointing perpendicular to the third and sixth legs. Further, the inductor includes a first electrical coil wound about a leg of the first E-core and a second electrical coil wound about a leg of the second E-core.

Inductors and electrical apparatuses according to the present invention can provide the very distinct advantage of combining "common mode" inductance and "differential mode" inductance in a single inductor.

BRIEF DESCRIPTION OF THE DRAWINGS

FIG. 1 is an electrical schematic of an electrical system 10 according to one embodiment of the present invention.

FIG. 5 is an electrical schematic of a prior art electrical system containing a buck inductor 208 and a common mode choke 218.

DETAILED DESCRIPTION OF THE PREFERRED EMBODIMENT

Figure 2:
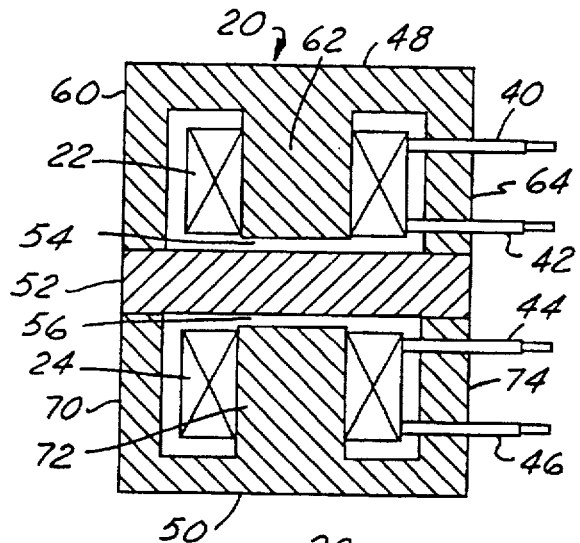
FIG. 2 is a cross-sectional view of inductor 20 of FIG. 1.

Refer first to FIG. 1, where a DC-to-DC converter 10 according to one embodiment of the present invention is illustrated. DC-to-DC converter 10 includes a transformer 12 having a primary coil 14 and a secondary coil 16. A switching voltage is applied at primary coil 14 by any of the conventional means for generating such a switching voltage. A second switching voltage is consequently generated at secondary coil 16, making secondary coil 16 a source of switching voltage for the remainder of the system. A rectifier 18 rectifies the output from secondary coil 16. Coupled to rectifier 18 is an inductor 20, the construction of which will be described in more detail below. Inductor 20 has two coils 22 and 24. As will also be described below, inductor 20 acts as both a "differential mode" buck inductor and a common mode choke.

DC-to-DC converter 10 further includes a "differential mode" filter capacitor 26 and "common-mode" filtering capacitors 28 and 30. Capacitors 28 and 30 are preferably coupled to ground 32. One or more electrical loads 34 are coupled to DC output terminals 36 and 38 of DC-to-DC converter 10.

Refer now additionally to FIG. 2 for a more detailed description of the construction of inductor 20 according to this embodiment of the present invention. Inductor 20 includes a first "E" -core member 48 and a second "E" -core member 50, each preferably made of ferromagnetic material. Between E-core members 48 and 50 is an "I" -core member 52, also preferably made of ferromagnetic material. If desired to provide the preferred inductive properties of inductor 20, air gaps 54 and 56 can be provided. E-core members 48 and 50 and I-core member 52 are held together by suitable mechanical means, such as banding.

Coil 22 includes ends 40 and 42, while coil 24 includes ends 44 and 46. Additionally, E-core member 48 further includes legs 60, 62 and 64. E-core member 50 includes legs 70, 72 and 74.

The operation of inductor 20 in DC-to-DC converter 10 will now be described. "Differential mode" current (that which would normally flow through a conventional buck inductor) passes in the path labelled "$i_d$" in FIG. 1. That is, the current passes through coil 22, differential mode filter capacitor 26 and coil 24. Thus, coil 22 and coil 24 together comprise a single inductor which acts as a differential mode inductor. The combined number of turns in coil 22 and coil 24 are selected (in view of the geometry of the core of inductor 20, which certainly is also relevant) to provide the desired "differential mode" inductance. (It should be indicated that some "differential mode" current also flows through capacitors 28 and 30 and, of course, through loads 34.)

Common mode currents, on the other hand, are shown in FIG. 1 designated as $i_{cm1}$ and $i_{cm2}$. Common mode current $i_{cm1}$ flows through coil 22 and common mode filter capacitor 28, and then to ground 32. Common mode current $i_{cm2}$ flows through coil 24 and common mode filter capacitor 30, and then to ground 32. Assuming that the core of inductor 20 is symmetric as seen by the flux generated by $i_{cm1}$ and $i_{cm2}$ (as is the case with the design shown in FIG. 2), and assuming that common mode capacitors 28 and 30 are of equal capacitance, the number of turns in coils 22 and 24 are preferably selected to be equal.

As this discussion has illustrated, inductor 20 acts as both a differential mode and a common mode inductor. Thus, separate differential mode and common mode inductors are no longer needed.

Figure 3A:
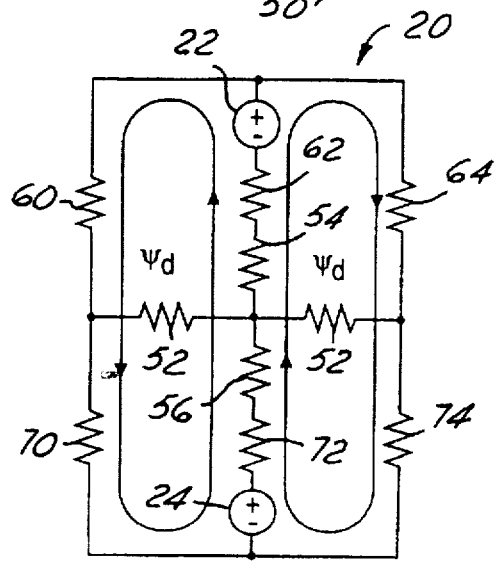
FIG. 3A is an electrical analogue of inductor 20, showing the paths occupied by electromagnetic flux when inductor 20 is provided with "differential mode" current.

Refer now to FIGS. 1, 2, 3A and 3B for a further discussion of the operation of inductor 20 of this embodiment of the present invention. FIG. 3A is an electric circuit analogue of inductor 20 when inductor 20 is provided differential mode current $i_d$. The resistors in FIG. 3A represent the reluctances of the various commonly-numbered portions of inductor 20 as illustrated in FIG. 2. As can be seen in FIG. 3A, coils 22 and 24 are magnetomotive force generators whose "outputs" are reinforcing (they both generate flux in the upward direction in FIG. 3A). Electrical circuit analysis of the electrical analogue shown in FIG. 3A will indicate that the differential mode flux $\psi_d$ in the circuit will be as shown. The flux will not pass through I-core member 52.

Figure 3B:
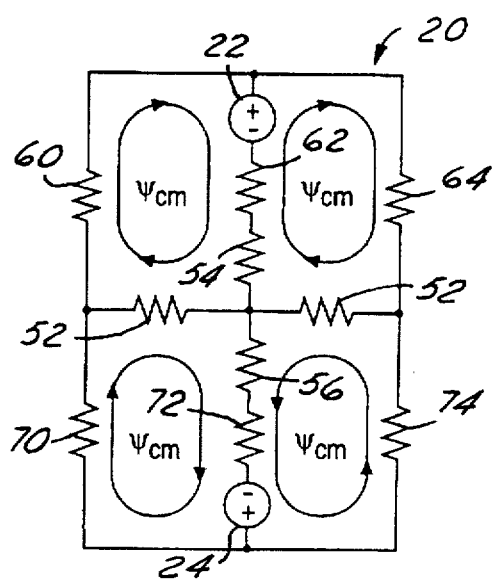
FIG. 3B is an electrical analogue of inductor 20, showing the paths occupied by electromagnetic flux when inductor 20 is provided with "common mode" current.

FIG. 3B, on the other hand, is an electric circuit analogue of inductor 20 when it is provided with common mode currents $i_{cm1}$ and $i_{cm2}$. Here, it can be seen that common mode flux $\psi_{cm}$ does pass through I-core member 52.

A comparison of FIGS. 3A and 3B illustrates that air gaps 54 and 56 are in the paths of both $\psi_d$ and $\psi_{cm}$. Because the reluctance of an air gap is much larger than the reluctance of the ferromagnetic material comprising E-core members 48 and 50, the differential mode and common mode inductances of inductor 20 are both strong functions of the air gap size. Thus, both the common mode and differential mode inductances are readily modified by modifying the size of air gaps 54 and 56.

A comparison of FIGS. 3A and 3B also illustrates that common mode flux $\psi_{cm}$ goes through I-core 52, while differential mode flux $\psi_d$ does not. Because common mode flux $\psi_{cm}$ does not go through I-core 52, I-core 52 can be made relatively small in cross-sectional area without fear of magnetic saturation.

Figure 4:
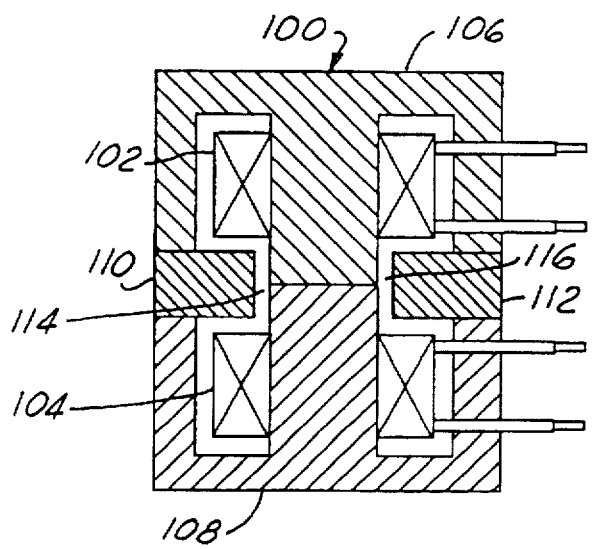
FIG. 4 is an alternative design for an inductor 100 according to another embodiment of the present invention.

If desired to meet a particular requirement for inductance of inductor 20, an alternative design for inductor 20 can be used. Refer to FIG. 4. Here, an inductor 100 includes a first coil 102 and a second coil 104. Inductor 100 also includes a first E-core member 106 and a second E-core member 108. Two I-core members 110 and 112 are further provided, with air gaps 114 and 116 defined by E-core members 106 and 108 and I-core members 110 and 112. In this design, air gaps 114 and 116 are in the path of the common mode flux only, not in the path of the differential mode flux (compare with FIGS. 2, 3A and 3B). Thus, the size of air gaps 114 and 116 can be modified to change the common mode inductance of inductor 100 without affecting the differential mode inductance.

Refer again to FIG. 2. Based on the discussion throughout this disclosure, one of ordinary skill in the art will readily agree that E-core members 48 and 50 can each be replaced by a "U"-core member. This could be accomplished, for example, by removing leg 60 of E-core member 48 and leg 70 of E-core member 50. In fact, E-core members 48 and 50 can each be considered to include a U-core member. Replacement of E-core members 48 and 50 by U-core members will still result in the provision of common mode inductance and differential mode inductance by inductor 20.

One of skill in the art will also recognize that the provision of air gaps 54 and 56 (FIG. 2) and 114 and 116 (FIG. 4) and the size of those air gaps can be used to provide specific desired values of common mode and differential mode inductance. However, elimination of those do not prevent the use of inductors 20 (FIG. 2) and 100 (FIG. 4) to advantage as combination differential mode and common mode inductors.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. An inductor comprising:
   a core defining a first electromagnetic path, a second electromagnetic path and a third electromagnetic path, said first and second magnetic paths distinct from one another, said third electromagnetic path substantially closing said first and said second electromagnetic paths;
   a first electrical coil wound about at least a portion of said first electromagnetic path; and
   a second electrical coil wound about at least a portion of said second electromagnetic path;
   wherein said first electromagnetic path contains a first air gap and said second electromagnetic path contains a second air gap.

2. An inductor as recited in claim 1, wherein said first electromagnetic path is defined by a first U-shaped electromagnetic core and said second electromagnetic path is defined by a second U-shaped electromagnetic core member.

3. An inductor as recited in claim 1, wherein said first electromagnetic path is defined by a first E-shaped electromagnetic core and said second electromagnetic path is defined by a second E-shaped electromagnetic core member.

4. An inductor as recited in claim 1, wherein said first electrical coil and said second electrical coil have the same number of turns.

5. An inductor as recited in claim 2, wherein said first electrical coil and said second electrical coil have the same number of turns.

6. An inductor as recited in claim 3, wherein said first electrical coil and said second electrical coil have the same number of turns.

7. An electrical apparatus comprising:

a source of voltage which switches between a relatively higher-voltage rail and a relatively lower-voltage rail;

an inductor as recited in claim 1, wherein said first coil has a first end and a second end and said second coil has a third end and a fourth end, said first end coupled to said relatively higher-voltage rail and said third end coupled to said relatively lower-voltage rail.

8. An electrical apparatus as recited in claim 7, further comprising:

a first capacitor coupled across said second and fourth ends;

a second capacitor coupled to said third end;

a third capacitor coupled to said fourth end.

9. An electrical apparatus as recited in claim 8 wherein:

said apparatus has an electrical ground;

said second capacitor is further coupled to electrical ground; and said third capacitor is further coupled to electrical ground.

10. An electrical apparatus as recited in claim 7, wherein said first, second, third and fourth ends are assigned such that an electrical current flowing into said first end and an electrical current flowing into said third end produce opposing electromagnetic flux.

11. An electrical apparatus as recited in claim 8, wherein said first, second, third and fourth ends are assigned such that an electrical current flowing into said first end and an electrical current flowing into said third end produce opposing electromagnetic flux.

12. An inductor comprising:

a first E-core member comprising first, second and third parallel legs;

a second E-core member comprising fourth, fifth and sixth parallel legs pointing toward said first, second and third parallel legs, respectively; and an I-core member disposed between said first and second E-core members.

13. An inductor as recited in claim 12, further comprising:

a first electrical coil wound about a said leg of said first E-core member; and a second electrical coil wound about a said leg of said second E-core member.

14. An inductor as recited in claim 13, wherein said first and second electrical coils comprise the same number of turns.

15. An inductor as recited in claim 14, wherein at least one of said legs and said I-core member define an air gap therebetween.

16. An inductor comprising:

a first E-core member comprising first, second and third parallel legs;

a second E-core member comprising fourth, fifth and sixth parallel legs pointing toward said first, second and third parallel legs, respectively;

a first I-core member disposed between said first and fourth legs and pointing perpendicular to said first and fourth legs;

a second I-core member disposed between said third and sixth legs and pointing perpendicular to said third and sixth legs;

a first electrical coil wound about a said leg of said first E-core; and a second electrical coil wound about a said leg of said second E-core.

17. An inductor as recited in claim 16, wherein said first electrical coil and said second electrical coil comprise the same number of turns.

18. An inductor as recited in claim 16, wherein:

said first I-core, said second leg and said fourth leg define an air gap between said first I-core and said second and fourth legs.

* * * * *